United States Patent [19]
Battin et al.

[11] 3,779,809
[45] Dec. 18, 1973

[54] METHOD OF PRODUCING FREEZE GROUND BROWN SUGER AND PRODUCT OF SAID METHOD

[75] Inventors: Marshall Battin, Golden; Brooks M. Stein, Loveland, both of Colo.

[73] Assignee: The Great Western Sugar Company, Denver, Colo.

[22] Filed: Aug. 20, 1971

[21] Appl. No.: 173,412

[52] U.S. Cl. ............... 127/63, 99/141, 127/21, 127/30
[51] Int. Cl. ............................................. C13f 3/00
[58] Field of Search ................ 127/29, 30, 63, 21; 99/141

[56] References Cited
UNITED STATES PATENTS

| 2,910,388 | 10/1959 | Lachmann | 127/29 X |
| 2,910,389 | 10/1959 | Lachmann | 127/30 X |
| 2,910,386 | 10/1959 | Lachmann | 127/30 |
| 2,910,387 | 10/1959 | Lachmann | 127/30 |
| 3,074,821 | 1/1963 | Laperouse | 127/30 X |
| 3,098,767 | 7/1963 | Bush | 127/30 X |
| 3,140,201 | 7/1964 | Reimers | 127/30 X |
| 3,194,682 | 7/1965 | Tippens | 127/30 |

OTHER PUBLICATIONS

"Cane Sugar Handbook", 342, John Wiley and Sons, New York, 1945.

Primary Examiner—Morris O. Wolk
Assistant Examiner—Sidney Marantz
Attorney—Edwards, Spangler, Wymore & Klaas

[57] ABSTRACT

A method of increasing the flowability of brown sugar, which facilitates packaging of such sugar, which involves freezing a brown sugar mix within a range of from −50°C. to −10°C., preferably to about −20°C. to establish a brittle and hard frozen consistency. The hard frozen brown sugar is then subjected to a size reduction action to establish a grain size approximately the same as in the brown sugar before freezing. An end product is attained which has a bulk density of about 41 pounds per cubic foot and has free-flowing properties to facilitate packaging.

11 Claims, 1 Drawing Figure

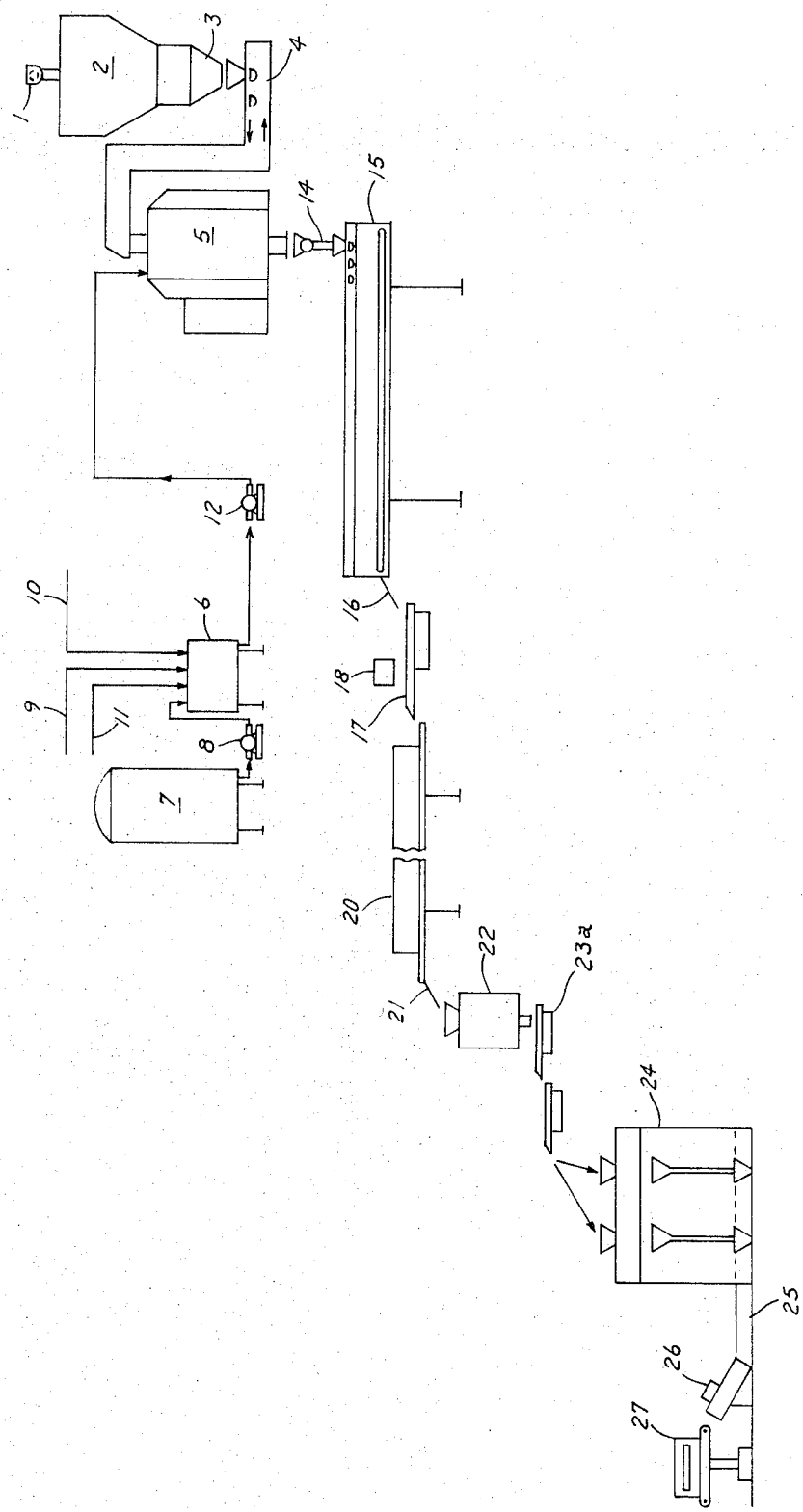
INVENTORS
MARSHALL V. BATTIN
BROOKS M. STEIN
ATTORNEYS

METHOD OF PRODUCING FREEZE GROUND BROWN SUGER AND PRODUCT OF SAID METHOD

This invention relates to a method of preparing brown sugar for packaging, and more particularly machine packaging, and also relates to the brown sugar product of such preparation.

Brown sugar as heretofore produced for the market has a tendency to set up and absorb atmospheric moisture with the result that it becomes lumpy and lacks desirable free flowing properties for the convenience of the user. Such setting up tendencies are fast acting and even newly produced brown sugar is slow flowing and impedes prompt packaging, either manual or by machine, thereby increasing the labor requirement per unit and lessening the accuracies of weight per package.

These difficulties prompted a decision to investigate a freeze grind procedure as a means of increasing the flowability of brown sugar in the packaging operation. Suitable equipment was assembled for the freezing and size reduction stages and from the beginning satisfactory results were obtained. A large number of tests were undertaken to determine optimum temperatures and effective ranges at the freezing stages, and to determine accuracy of weights of charges so evolved. In addition to greatly improving flowability, the brown sugar produced by our freeze-grind procedure more closely resembles cane sugar than beet sugar and provides a brown sugar which dissolves more readily when used in recipes than non-frozen brown sugar and which has a selected moisture content.

Accordingly, it is an object of our invention to provide a simple, economical and efficient method for freezing and grinding brown sugar for greatly improving flowability thereof so as to increase the speed of packaging, either manually or by machine.

Another object of the invention is to provide a simple, efficient and economical process for improving the flowability characteristics of brown sugar prior to packaging.

A further object of our invention is to provide a simple, efficient and economical method for producing a uniform weight per given volume of brown sugar so as to improve the accuracy of packaging operations.

Still another object of our invention is to provide a high quality brown sugar of granular appearance having free flowing properties that facilitate packaging, which more closely resembles cane sugar than beet sugar, which dissolves more readily than non-frozen brown sugar when used in recipes, and which has a selected color and a selected moisture content.

The practice of our invention will be described now with reference to the accompanying flow sheet drawing illustrating an arrangement of procedures and equipment effective in attaining the objects of our invention. As shown, brown sugar is delivered by a feeding device 1 to a surge hopper 2 provided with a scale 3 from which weighed increments of sugar are passed to the buckets of a bucket elevator 4 and delivered by it to a blender 5. An invert mix tank 6 may be supplied selectively with syrup from a syrup supply tank 7 by a pump 8, and sugar, water and acid may be introduced into the mix tank 6 as shown at 9, 10 and 11 with regulated quantities of the mixture from mix tank 6 being delivered by a pump 12 to blender 5. The amount of water so introduced determines the moisture content of the brown sugar and the quantity of syrup introduced may be utilized to provide a standard color effect for the same quantity of syrup and a color selection by varying the quantity introduced.

The product of blender 5 is discharged into a feeding device 14 which supplies a product storage container 15 having a chute discharge 16 onto a vibrating conveyor 17. A detector 18 is disposed over the vibrating conveyor 17 for elimination of any contaminant metal which may have been deposited in the brown sugar as foreign matter. The conveyor 17 introduces charges of the brown sugar mix into a cryogenic food freezer 20 preferably utilizing liquid nitrogen as the heat exchange media. The charges of brown sugar mix introduced into the freezer 20 are conducted through it to a point of discharge at a predetermined rate of travel which establishes a selected temperature for the frozen sugar charge in a predetermined time interval so that the respective charges discharging from the freezer 20 are at a uniform temperature at discharge. We have found that a temperature of minus 20°C. is quite satisfactory for this purpose.

The product discharge of freezer 20 is directed by a chute 21 to a grinder 22 which subjects the frozen brown sugar to size reduction and relatively uniform sizing preferably at about minus 65 mesh screen size. The discharge of grinder 22 is conducted by a plurality of vibrating conveyors 23a and 23b to discharge to a bag making device 24 in which bags are filled with weighed charges of the ground brown sugar and conducted by a conveyor 25 past a tying device 26 which closes or seals the filled package, after which the package is again check-weighed on a scale 27 and conducted to transport, packaging or storage.

Tests were undertaken to determine the minimum time in which sugar would freeze and produce a suitable material for grinding. These tests were performed at −50°, −40° and −30°C. The following table lists the minimum time for each condition:

| Freezer Temperature | Minimum Time |
|---|---|
| −50°C. | 40 seconds |
| −40°C. | 65 seconds |
| −30°C. | 73 seconds |

Another series of tests was conducted in which the sugar moving through the freezer was transported on a foraminous surface permitting heat exchange from both top and bottom. The following table lists the minimum time for each temperature:

| Freezer Temperature | Minimum Time |
|---|---|
| −30°C. | 65 seconds |
| −20°C. | 118 seconds |
| −10°C. | 290 seconds |
| Sugar Depth = ½ Inch | |
| −20°C. | 75 seconds |
| −10°C. | 118 seconds |

Whether the syrup on the sugar actually was frozen is not known but in any event the sugar was hard enough to grind without being sticky. Acutally the sugar became dusty during the grinding operation. The bulk density of brown sugar before treatment ws measured at 39 pounds per cubic foot and 41 pounds after freezing and grinding. After freezing and grinding, the sugar would flow freely on a vibrator and 2 pounds of processed sugar filled a standard 2 pound bag with adequate room for sealing. Comparative screen analysis of the sugar was made before and after freezing and grinding and it appears that excessive breakage of the crystal was avoided. Some moistures before and after also were checked. The sugar actually picked up moisture during freezing and grinding. Another distinctive characteristic of the brown sugar produced by our novel method is that it dissolves completely in about 2½ minutes in cooking by recipe and crystallized very little.

It is apparent from the foregoing description that the freezing and grinding of the brown sugar as disclosed herein possesses considerable advantage, particularly in reducing the expense of packaging. In this connection, using existing installations for the actual packaging, the freeze and grind procedure greatly reduces the total number of employees required in the packaging operation.

We claim:

1. The method of increasing the flowability of brown sugar for facilitating the packaging thereof, which comprises freezing brown sugar at a temperature within the range of −50°C. to −10°C. to a brittle and hard consistency, and subjecting the hard frozen brown sugar to size reduction to produce a product of about −65 mesh having a bulk density of about 41 pounds per cubic foot.

2. A method as defined in claim 1, in which the brown sugar of the treatment is mixed with sugar syrup and water before freezing.

3. A method as defined in claim 1, in which the sugar in the freezing stage is subjected to a temperature of about −20°C.

4. A method as defined in claim 1 wherein the sugar is frozen by moving it progressively through a cyrogenic food freezer on a foraminous support.

5. A method as defined in claim 1, in which the sugar is frozen in a low temperature nitrogen atmosphere.

6. A method as defined in claim 1, including the step of packaging sugar after size reduction.

7. A method as defined in claim 1, in which the sugar being frozen is distributed as a bed on a foraminous support to a depth of about one-half inch.

8. The method of increasing the flowability of brown sugar for facilitating packaging of said sugar, which comprises blending water with brown sugar, freezing the blended sugar to a temperature within the range of −50°C. to −10°C. so as to establish a brittle and hard frozen consistency, and reducing the hard frozen brown sugar to a screen size product of about −65 mesh having a bulk density of about 41 pounds per cubic foot.

9. The method as defined in claim 8, in which the quantity of moisture in the blending step is varied so as to change the moisture content of the final sugar product.

10. The method of increasing the flowability of brown sugar for facilitating packaging of said sugar, which comprises blending sugar syrup with brown sugar, freezing the blended sugar to a temperature within the range of −50°C. to −10°C. so as to establish a brittle and hard frozen consistency, and reducing the hard frozen brown sugar to a screen size product of about −65 mesh having a bulk density of about 41 pounds per cubic foot.

11. The method as defined in claim 10, in which the quantity of syrup in the blending step is varied to change selectively the color of the final sugar product.

* * * * *